United States Patent

[11] 3,621,286

[72] Inventor Eugene C. Varrasso
1853 Cedar Circle, Heath, Ohio 43055

[21] Appl. No. 17,677
[22] Filed Mar. 9, 1970
[45] Patented Nov. 16, 1971

[54] MEMORY UNIT PROVIDING OUTPUT OVER LONGER TIME PERIODS THAN DURATION OF INDIVIDUAL INPUT SIGNALS
15 Claims, 2 Drawing Figs.

[52] U.S. Cl. .......... 307/238, 307/246, 307/251, 328/151, 328/127
[51] Int. Cl. .......... G11c 11/34
[50] Field of Search .......... 328/151, 120, 127; 307/238, 304, 246, 251

[56] References Cited
UNITED STATES PATENTS

| | | | |
|---|---|---|---|
| 3,213,375 | 10/1965 | St. John | 328/120 X |
| 3,490,691 | 1/1970 | Uyetani et al. | 328/151 X |
| 3,495,096 | 2/1970 | Blachowicz et al. | 307/251 X |
| 3,535,658 | 10/1970 | Webb | 328/151 X |

*Primary Examiner*—John S. Heyman
*Attorneys*—Staelin & Overman and Myron E. Click

ABSTRACT: Control apparatus which includes a memory unit having input means for receiving successive input signals and output means for providing an output signal over periods of time longer than the duration of individual input signals and which is functionally related to the last-received input signal; and storage means for receiving, averaging, and storing the successive input signals. Means are provided for connecting the averaging or storage means to apply the averaged signal stored therein to the input means in response to an interruption in the reception of the successive input signals by the input means of the memory unit.

Figure 1:
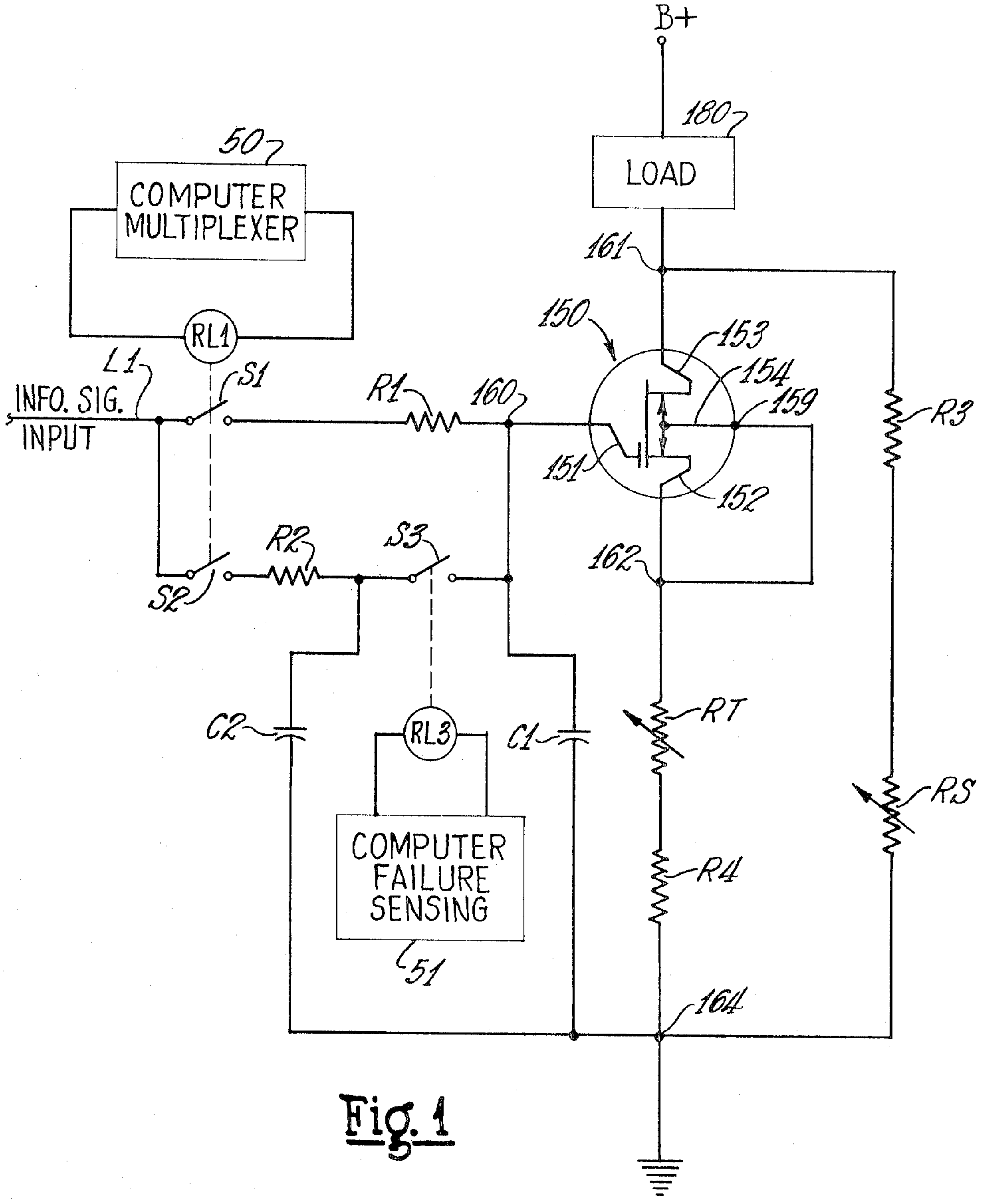

INVENTOR.
EUGENE C. VARRASSO
BY
Staelin & Overman
ATTORNEYS

INVENTOR.
EUGENE C. VARRASSO
BY
Stalin & Overman
ATTORNEYS

MEMORY UNIT PROVIDING OUTPUT OVER LONGER TIME PERIODS THAN DURATION OF INDIVIDUAL INPUT SIGNALS

With a continual expansion of automated controls for system operation, emphasis is constantly being placed on low-cost components and the reliability of the components. This has resulted in the refinement of saturable reactors, more reliable vacuum tube components and other known components, and in the development of new control components such as the semiconductor family. The reactor, heavy-duty vacuum tube, and the semiconductor component reliability is enhanced since there are no moving parts. This development to the very recent past has concentrated on a component capable of providing a quick, complete response to an input signal. In turn, there is usually connected therewith a relatively fast, substantially one-shot output. In response to the additional need for a control component which is able to provide a prolonged output signal, which output signal is variable in response to intermittent input signals, there has been developed and is disclosed in U.S. Pat. No. 3,467,947, issued on Sept. 16, 1969, a memory unit which fulfills the stated requirements. Reliability was attained in the memory unit by the development of a device having no moving parts, but which is capable of providing a sustained and prolonged output with little degree of change even though an input signal is not received for a substantial period of time.

Such a memory unit is suitable for use with process valves controlled by computers and, in certain instances, permits the time sharing of a single digital to analog converter with a number of process valves rather than requiring a separate converter for each valve. In a system of this type the computer normally receives process input signals from sensors associated with variables of the process, and from these input signals calculates the adjustments necessary for the process valves to bring the variables to the predetermined desired levels.

When the computer is a digital computer each digital computation must be translated to an analog signal for adjustment of the respective valve in the process. The computer makes a quick calculation for each variable and in a fraction of a second supplies the signal for adjustment of one or more valves associated with the variable. The computer than transfers to the next variable and similarly computes and supplies an adjustment or control signal. Heretofore in prior art systems only the computer was time shared by a number of digital to analog converters, each associated with its own process valve to be controlled. With the memory device described in the above-referenced patent the multiplicity of digital to analog converters, each for a separate valve, may be replaced with a single digital to analog time-shared converter and a memory unit for each valve or condition to be controlled. Since the memory unit costs substantially less than an analog converter, it may be seen that a considerable savings can be obtained without sacrificing reliability and, in fact, adding desirable features.

The above-described memory unit has been highly satisfactory, however, the components being controlled receive an output signal from the memory unit which is functionally related to the last input signal issued by the computer and received by the memory unit. If the last-received input signal was momentarily too high or too low because of an error in computation, an error in sensing in the process control loop, transients in the system, etc., the memory unit has correspondingly controlled the components in the loop at this last-received incorrect input signal for a substantial period of time if there has been an interruption in the reception of successive input signals for any reason. For example, a fault in the connections, computer shut down, interruption for maintenance or change of programs, etc., will interrupt the flow of successive input signals to the memory unit. It is very desirable to avoid control of components in a process loop at an incorrect level for any substantial period of time.

Accordingly, it is an object of this invention to provide improved control apparatus.

It is a further object of this invention to provide improved control apparatus in which a memory unit which is responsive to successive input signals to provide a sustained output signal over along period of time, is prevented from operating from a last-received incorrect input signal in the event of an interruption of successive input or information signals to the memory unit.

It is a still further object of this invention to provide improved control apparatus in which a memory unit which is responsive to supply an output signal which is functionally related to the last-received input signal of a succession of input signals, is provided with an input signal representing an average of a plurality of previously received input signals, after the interruption of the flow of successive input signals to the input means of the memory device.

In carrying out the above objects, the control apparatus of this invention features electronic valve means having first and second electrode means for connection to a source of output voltage and third electrode means for receiving an input signal and controlling the amount of current flowing between first and second electrodes in response thereto. First storage means may be connected to receive and store successive input signals and apply the last-received input signal to the third electrode means. Second storage means receives, averages, and stores the successive input signals. Means are provided for connecting the averaged signal stored in the second storage means to the third electrode means in response to an interruption in reception of the input signals by the first storage means. The input signals may be supplied by data processing means and the second storage connecting means may include means for sensing continued operation of the date processing means and switching means responsive to the sensing means to connect the second storage means to the third electrode. The second storage means may be connected to transfer the averaged signal stored therein to the first storage means in response to the interruption in reception of input signals by the first storage means.

In a preferred embodiment disclosed herein a field-effect transistor is utilized which has a drain electrode, a source electrode and a gate electrode for controlling current flow between the drain and source electrodes. First storage means are connected to receive and store successive input signals and apply the last-received input signal to the gate electrode. Second storage means receives, averages, and stores the successive input signals. Switching means are shown for connecting the averaged signals stored in the second storage means to the gate electrode in response to an interruption of the successive input signal. Each storage means may comprise a resistance-capacitance circuit. The time constant of the second storage means is preferably relatively long compared to the time constant of the first storage means.

The averaged signal stored in the resistance-capacitance circuit of the second storage means may be connected to transfer that signal to the resistance-capacitance circuit of the first storage means in response to an interruption of the input signals. Means are disclosed for limiting the time of connection of the second storage means to the first storage means so that a lower quality, less expensive capacitor may be utilized in the second storage means without degrading the quality of operation of the entire control unit. Further, the second storage means may include means for limiting the time for averaging the input signals to a predetermined period prior to interruption of the successive input signals, by selecting values of the resistance-capacitance circuit to provide a time constant which allows the circuit to reflect an average of the number of successive control or input signals received over the period of the time constant.

Figure 2:
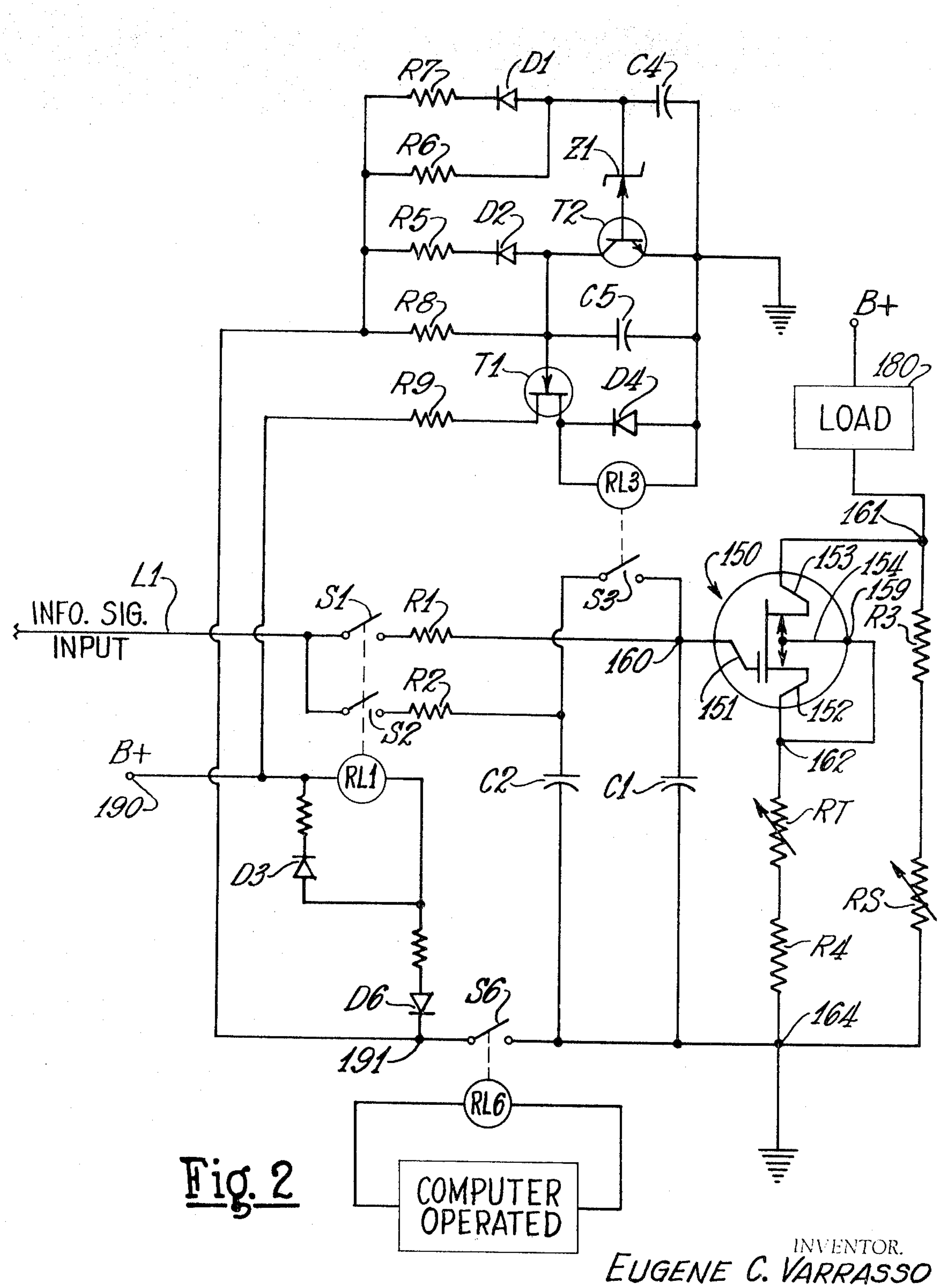

Other objects, advantages and features of the present invention will become readily apparent when the following description is taken in conjunction with the accompanying drawings, in which:

FIG. 1 is a schematic diagram of a first circuit embodying the teachings of this invention; and FIG. 2 is a schematic diagram of a circuit illustrating a second embodiment of the teachings of this invention.

Referring to FIG. 1 there is illustrated in circuit diagram a memory unit component to which the teachings of this invention are applied. The memory unit is disclosed in the above-referenced U.S. patent and is adapted to receive input signals of very short duration and provide output signals, proportional in magnitude or functionally related to the last-received input signal, over long periods of time. The unit comprises an electronic valve means generally indicated at 150 having a very high input resistance and including a control or gate electrode means 151, a plate or drain electrode means 153, a cathode or source electrode means 152, and a second control or substrate and case electrode means 154. Terminal means 161, 162 and 164 provide means for connecting an output means 180 and source voltage means such as the B+ voltage in circuit with the plate or drain electrode means 153 and the cathode or source electrode means 152. A first storage means including a capacitor C1 and resistance R1, is connected to control or gate electrode means 151 via terminal means 160. The capacitive storage means C1 is operative to receive and store input signals applied to terminal 160 and thus to the control electrode means 151 thereby controlling the output of the memory means to the output means or load 180.

The electronic valve means utilized in this invention may be any electronic valve means having a sufficiently high input resistance or impedance and capable of providing the same operation as required in the example set forth. Advantageously, an electronic valve means of the silicon insulated-gate, field-effect transistor means such as the 3N139 commercially available from the Radio Corporation of America may be used in this application. These transistors have the gate offset toward the source to provide substantially reduced feedback capacitance, and a very high input resistance (in the order of $10^{15}$ ohms). The devices are relatively insensitive to temperature. The combination of load to bias capacitance and very high input impedance makes this particular electronic valve means especially useful in this application. As will be noted the second control or substrate and case electrode means 154 is connected to the terminal 162 to ensure that this electrode means operates at substantially the same potential as the cathode or source electrode means 152. Further, via a connection to 159 the second control or substrate electrode means is connected to the case of the electronic valve means 150. In operation, current flow between the first load electrode 153 and second load electrode 152 is controlled by the signal present at the third or control electrode 151.

The output means or load 180 is connected in this instance in series between one side of the voltage supply source B+ and the electrode 153. A "zero" adjustment impedance means, shown as an adjustable resistance RS, is connected between the electrode 153 and the other side of the voltage supply source. The connection illustrated in the drawing permits current to flow through both the output means 180 and the "-zero" adjustment impedance means RS, the value of the "-zero" adjustment impedance means determining the initial operating level and current flow through the output means 180. This may be established before an input signal is applied to or received by the capacitor C1. Thus the "zero" adjustment impedance RS and a current limiting resistor R3 are in series alone with the load 180, when an input signal is not present at the control electrode means 151.

A "span" impedance means, noted in the drawing as an adjustable resistor RT, is connected in series with a current-limiting resistor R4 between the second load electrode 152 and the voltage supply means to permit regulation of the gain of the electronic valve means independently of the "zero" adjustment impedance means RS.

Thus, in this arrangement the output means 180 has current from both the "zero" adjustment and "span" adjustment branches passing therethrough. The output means in the circuit of FIG. 1 is therefore affected independently by both the span branch and the zero branch signals. The span of this circuit can be suppressed to amplify the reading and narrow range of operation of the circuit, and the zero reading can be elevated to the desired operating level.

The memory unit just described is adapted to receive and record a substantially instantaneous signal, corresponding in magnitude to a computed value for its valve or other condition being controlled, and hold the recorded value for use by the valve after the computer has been switched to a subsequent branch or loop for which the system is to act similarly. The high input impedance of the electronic valve means allows a signal charged into a good quality condenser C1 to be recorded and fed from the condenser C1 to the valve or other condition being controlled for adjustment without draining the condenser C1 of the signal supplied to it. In tests, the memory unit has permitted a signal to be recorded and fed to a valve or other control medium, while at the same time holding its recorded value in excess of 24 hours within 1 percent of the original value.

The first storage means includes the capacitor C1 and the resistor R1 connected in series between ground and the lead L1 from which information signals are arriving from the computer. The contacts or switch S1 of a relay RL1 connects the information signal through the resistance R1 to the capacitor C1. A multiplexer 50 is adapted to select individual input stations and connect them to the central data processing unit. Thus, whenever the computer is ready to transfer an information signal to the memory unit 150 the relay RL1 is energized to close its contacts S1.

A second storage means including capacitor C2 and resistor R2 is connected in parallel with the first storage means via contacts or switch S2 of relay RL1. Contacts S2 are operated at the same time as contacts S1 and thus the second storage means receives successive input signals from lead L1 in the same manner as the first storage means. The second storage means is isolated from the first storage means by contacts S3 of relay RL3. Therefore, each individual input signal received by the second storage means is not applied to terminal 160 or the gate or control electrode 151. Rather, as successive input signals are received by the second storage means they are averaged by the capacitor C2 and the averaged signal remains stored in the second storage means.

The time constant of the first storage circuit R1–C1 is made very short, for example approximately 1 millisecond. Therefore, the first storage circuit maintains a current or up-to-date computer control or input signal and performs the customary function of controlling the output of the unit 150 to the load 180 in response to the last-received input signal. The second storage circuit has a time constant which is comparatively long in comparison with that of the first storage circuit, e.g., 15 minutes to 2 hours, and allows the second storage means to reflect an average of the successive input signals received over the period of time chosen.

When the data processing unit is in operation, switches S1 and S2 are closed and opened in response to the computer multiplexer 50. Contacts S3 of the relay RL3 remain open. A shut down of the computer or data processing unit results in the contacts S1 and S2 going to their normally open position since the multiplexer 50 is no longer in operation. However, the computer failure or shut down sensing circuit 51 energizes relay RL3 to close contacts S3. When contacts S3 are closed capacitor C1 is charged to a value equal to the averaged signal stored in capacitor C2 and provides the unit 151 with an input signal which is an average of the successive input signals received over the period of the time constant of the second storage means. The contacts S3 of the relay RL3 are preferably only momentarily closed and then opened again after the charge is transferred from capacitor C2 to capacitor C1. This enables the use of a comparatively low-quality and inexpensive capacitor for the second storage circuit since a requirement of very low leakage is not required. Therefore, only one high-quality capacitor C1 is needed.

After the computer has been started again, the computer failure or shut down sensing circuit 51 does not energize relay RL3 and keeps contacts S3 open to isolate the second storage means or circuit from the unit 150. The multiplexer 50 returns to normal operation and energizes relay RL1 to close contacts S1 and S2 to transfer the information signal on lead L1 to capacitor C1 and C2 in the manner described hereinbefore.

Referring to FIG. 2 there is illustrated a second embodiment of the teachings of this invention which includes means for automatically sensing the interruptions of successive input signals to the first storage means to apply the averaged input signal from the second storage means to the unit 150. The components shown in FIG. 2 which are identical in function to those already described in FIG. 1, utilize the same reference characters and will not be described again.

In FIG. 2 the relay RL1 is connected between a B+ voltage source at terminal 190 and a diode D6 which is in turn connected to terminal 191. A relay RL6 having contacts S6 is operated by the computer to connect terminal 191 to ground periodically so that relay RL1 may be operated to permit application of input signals to the first and second storage means. For example, the relay RL6 may be energized for 2 milliseconds every 1 or 2 seconds so that a circuit is completed from terminal 190 through relay RL1, diode D6, terminal 191, and contacts S6 to ground. This permits current flow through this circuit to energize relay RL1. When the contact S6 is opened, the relay RL1 is deenergized opening contacts S1 and S2 and the current flow from the collapsing field in the relay coil is routed through diode D3 to prevent a transient effect on the remainder of the circuit.

An automatic sensing circuit is connected to terminal 191 and comprises a capacitor C4 which may be charged through the resistance R6 and discharged through the diode D1 and a smaller resistance R7. A capacitor C5 is similarly connected to be charged through a resistance R8 and discharged through the diode D2 and a smaller resistance R5.

A transistor unit T1 is connected to the capacitor C5 to selectively route an energizing current through relay RL3 to close contacts S3 and transfer the averaged input signal from the second storage means to the first storage means. The transistor unit T1 may be a three electrode device in which one of the base connections is reverse biased by the connection of the B+ source at terminal 190 through resistance R9. When a signal voltage from the capacitor C5 reaches a predetermined level all of the junctions or electrodes are effectively tied together and conduction through the unit T1 from capacitor C5 is permitted.

A second transistor unit T2 may be of the switching type in which conduction between emitter and collector is controlled by the application of a predetermined bias to the third electrode. A Zener diode Z1 connected between the third electrode and the capacitor C4 breaks down at a predetermined voltage level, allows application of the desired bias voltage to the third electrode, and permits conduction between the emitter and collector electrodes. The operation of the circuit illustrated in FIG. 2 is as follows. As noted hereinbefore, the instantaneous signal is contained in capacitor C1 of the first storage means while capacitor C2 of the second storage means contains the averaged signal. During normal operation any charge on capacitors C4 and C5 is removed by the periodic grounding of the terminal 191 through contacts S6.

When the contacts S6 have been opened more than a predetermined period of time, as in a computer failure, voltage from terminal 190 is applied through diode D6 and resistances R6 and R8 to charge the capacitances C4 and C5 toward the voltage level supplied at the terminal 190. The value of the resistance R6 is selected to be higher than that of R8 so that capacitor C4 charges more slowly than capacitor C5. When the charge capacitor C5 reaches a predetermined level the transistor unit T1 is biased so that the unit T1 conducts and permits capacitor C5 to discharge through relay RL3, momentarily closing contacts S3 and transferring the charge in capacitor C2 to the capacitor C1. When the charge on C5 drops below a predetermined level the transistor unit T1 stops conducting, relay RL3 is deenergized, and contact S3 opened.

The relationship between the charge time of capacitor C5 and that of capacitor C4 is such that capacitor C5 has an opportunity to charge several times and discharge several times into relay RL3 before the charge on capacitor C4 reaches a critical level. In some applications only one closure of contacts S4 may be necessary. At some later time, e.g., 15 or 20 seconds, capacitor C4 reaches a charge level which breaks down the Zener diode Z1 and puts a positive drive on the transistor switching unit T2. This permits conduction between collector and emitter of the transistor T2 and connects capacitor C5 to ground, keeping the capacitor C5 discharged. Therefore, capacitor C5 can no longer cause transistor unit T1 to conduct and energize relay RL3 to connect the capacitor C2 to capacitor C1.

Thus the automatic sensing circuit senses an interruption of the flow of successive input signals to the capacitor C1 and after a predetermined period, to insure that the interruption in successive input signals is not just a transient interruption, the automatic sensing circuit permits the averaged signal stored in capacitor C2 to be transferred to the high-quality capacitor C1.

When the computer operation returns to normal, contacts S1 and S2 start closing as previously indicated to supply input signals to capacitors C1 and C2 and contacts S6 start closing to reset the automatic sensing circuit by discharging capacitor C4.

As noted hereinbefore, the averaging period of the second storage means may be on a predetermined time selected basis or on the basis of a predetermined number of input signals. In the embodiments illustrated, if the input signals occur periodically, then the time constant may be designed to encompass a period during which a predetermined number of input signals occur.

In conclusion it is pointed out that while the illustrated examples constitute practical embodiments of may invention, I do not limit myself to the exact details shown, since modification may be made without departing from the spirit and scope of the invention.

I claim:

1. Control apparatus comprising a memory unit having input means for receiving successive input signals and output means for providing an output signal over periods of time longer than the duration of individual input signals and which is functionally related to the last-received input signal; means for receiving, averaging, and storing said successive input signals; and means for connecting said averaging means to apply the averaged signal stored therein to said input means in response to an interruption in the reception of said successive input signals by said input means.

2. Apparatus as defined in claim 1 which further includes means for limiting the number of said input signals averaged prior to interruption of said successive input signals.

3. Control apparatus comprising electronic valve means having first and second electrode means for connection to a source of output voltage and third electrode means for receiving an input signal and controlling the amount of current flowing between said first and second electrodes in response thereto; first storage means connected to receive and store successive input signals and apply the last-received input signal to said third electrode means; second storage means for receiving, averaging, and storing said successive input signals; and means for connecting the averaged signal stored in said second storage means to said third electrode means in response to an interruption in reception of said input signals by said first storage means.

4. Apparatus as defined in claim 3 in which said input signals are supplied by data processing means and in which said second storage connecting means includes means for sensing continued operation of said data processing means and switching means responsive to said sensing means.

5. Apparatus as defined in claim 3 in which said first and second storage means each comprise a resistance-capacitance circuit, said second storage means having a time constant which is relatively long in comparison with the time constant of said first storage means.

6. Apparatus as defined in claim 3 in which said second storage means is connected to transfer the averaged signal stored therein to said first storage means in response to said interruption in reception of input signals by said first storage means.

7. Apparatus as defined in claim 3 in which said averaging means includes means for limiting the averaging of said input signals to a selected period prior to interruption of said successive input signals.

8. Control apparatus comprising a field-effect transistor means having a drain electrode, a source electrode, and a gate electrode for controlling current flow between said drain and source electrodes; means for applying successive input signals to said gate electrode; means for receiving, averaging, and storing said successive input signals; and means for connecting said averaging means to said gate electrode in response to an interruption of said successive input signals.

9. Control apparatus comprising a field-effect transistor means having a drain electrode, a source electrode, and a gate electrode for controlling current flow between said drain and source electrodes; first storage means connected to receive and store successive input signals and apply the last-received input signal to said gate electrode; second storage means for receiving, averaging, and storing said successive input signals; and means for connecting the averaged signal stored in said second storage means to said gate electrode in response to an interruption of said successive input signals.

10. Apparatus as defined in claim 9 in which each storage means comprises a resistance-capacitance circuit.

11. Apparatus as defined in claim 10 in which the time constant of said second storage means is relatively long compared to the time constant of said first storage means.

12. Apparatus as defined in claim 10 in which said second storage means is connected to transfer the averaged signal stored therein to said first storage means in response to an interruption of said input signals.

13. Apparatus as defined in claim 12 which further includes means for limiting the time of connection of said second storage means to said first storage means.

14. Apparatus as defined in claim 9 in which said second storage means includes means for limiting the time for averaging the input signals to a predetermined period prior to interruption of said successive input signals.

15. Apparatus as defined in claim 9 in which said field-effect transistor means includes an insulated gate.

* * * * *